(12) United States Patent
Li et al.

(10) Patent No.: US 12,346,819 B1
(45) Date of Patent: Jul. 1, 2025

(54) METHOD, DEVICE, AND MEDIUM FOR PREDICTING FLUE DUST CONCENTRATION

(71) Applicant: Hunan University Of Technology and Business, Changsha (CN)

(72) Inventors: Huan Li, Changsha (CN); Hong Xue, Yiyang (CN); Liang Chen, Changsha (CN); Rongyuan Chen, Changsha (CN); Changqing Su, Changsha (CN); Shengbo Gu, Beijing (CN); Yang Chen, Xiangxiang (CN); Jiayin Guo, Hangzhou (CN); Linfeng Jin, Changsha (CN); Jingling Yang, Changsha (CN)

(73) Assignee: Hunan University Of Technology and Business, Changsha (CN)

( * ) Notice: Subject to any disclaimer, the term of this patent is extended or adjusted under 35 U.S.C. 154(b) by 0 days.

(21) Appl. No.: 18/732,648

(22) Filed: Jun. 4, 2024

(30) Foreign Application Priority Data

Apr. 10, 2024 (CN) .......................... 202410429537.3

(51) Int. Cl.
*G06N 3/084* (2023.01)
*G06N 3/048* (2023.01)

(52) U.S. Cl.
CPC ............. *G06N 3/084* (2013.01); *G06N 3/048* (2023.01)

(58) Field of Classification Search
CPC ................................ G06N 3/084; G06N 3/048
See application file for complete search history.

(56) References Cited

U.S. PATENT DOCUMENTS

| 8,515,582 B2 * | 8/2013 | Jia ........................ | G05B 13/048 |
| | | | 700/274 |
| 2018/0024508 A1 * | 1/2018 | Piche .................. | G05B 13/027 |
| | | | 706/23 |

(Continued)

OTHER PUBLICATIONS

Azid, I. A., et al. "Predicting combined-cycle natural gas power plant emissions by using artificial neural networks." 2000 TENCON Proceedings. Intelligent Systems and Technologies for the New Millennium (Cat. No. 00CH37119). vol. 3. IEEE, 2000. (Year: 2000).*

(Continued)

*Primary Examiner* — Randall K. Baldwin

(57) ABSTRACT

The invention discloses a method, a device and a medium for predicting a flue dust concentration, which calculate a flue dust emission amount of each batch of coal fed into a furnace based on hourly coal consumption of a unit as a label value of a prediction model, generate a general rule between data of the coal fed into the furnace and a corresponding flue dust emission amount through training the prediction model, accurately identify a relationship between material and the flue dust emission amount, reduce workloads of manual accounting and verification, and provide a reference for CEMS flue dust monitoring data. At the same time, using an Adam algorithm to optimize a BPNN allows for automatic adjustment of a learning rate for each parameter, enabling fast and efficient training of the prediction model. The invention can solve problems of measurement errors and complex manual accounting and verification in the related art, thereby achieving precise measurement of the flue dust emissions from coal-fired power plants and reducing workloads of manual operations.

5 Claims, 4 Drawing Sheets

(56) References Cited

U.S. PATENT DOCUMENTS

2022/0092482 A1\* 3/2022 Tang .................. G06N 5/02
2023/0016291 A1\* 1/2023 Zhou .................. G06N 3/048

OTHER PUBLICATIONS

Zheng, Ligang, Shuijun Yu, and Minggao Yu. "Monitoring NOx emissions from coal fired boilers using generalized regression neural network." 2008 2nd International Conference on Bioinformatics and Biomedical Engineering. IEEE, 2008. (Year: 2008).\*

Zheng, Ligang, et al. "Prediction of NOx concentration from coal combustion using LS-SVR." 2010 4th International Conference on Bioinformatics and Biomedical Engineering. IEEE, 2010. (Year: 2010).\*

Yin, Zhe, et al. "NOx concentration prediction in coal-fired power plant based on CNN-LSTM algorithm." Frontiers in Energy Research 10 (2023): 1054427. (Year: 2023).\*

Sharma, K. Ganpati Shrinivas, and Surekha Bhusnur. "Data Ensemble Model for Prediction of Oxygen Content in Gas fired Boiler for Efficient Combustion." 2023 IEEE International Students' Conference on Electrical, Electronics and Computer Science (SCEECS). IEEE, 2023. (Year: 2023).\*

Wang, Meng, et al. "Prediction of road dust concentration in open-pit coal mines based on multivariate mixed model." Plos one 18.4 (2023): e0284815. (Year: 2023).\*

Zhang, Da, et al. "Machine learning approaches reveal highly heterogeneous air quality co-benefits of the energy transition." Iscience 26.9 (2023). (Year: 2023).\*

\* cited by examiner

Algorithm 1 Calculate flue gas emissions for each coal

Require: the coal as fired datasets *coal*, the daily coal consumption datasets *daily_coal*, the daily runtime of unit datasets *daily_runtime*, the daily monitor time of unit datasets *daily_monitor*, the number of rows of daily_coal $m$, the smoke monitoring datasets *cems*

Ensure: flue gas emissions for each coal *result*

1: $i \leftarrow 0$
2: $j \leftarrow 0$
3: $l \leftarrow 0$
4: $emission \leftarrow 0$
5: $rulu\_mei \leftarrow mei[j]$
6: for $i \leq m$ do
7:   $hour\_coal \leftarrow daily\_coal[i]/daily\_runtime[i]$
8:   $k \leftarrow 1$
9:   if $daily\_runtime[i] \geq daily\_monitor[i]$ and $daily\_runtime[i-1] == 0$ then
10:    $rulu\_mei \leftarrow rulu\_mei - (daily\_runtime[i] - \lfloor daily\_runtime[i] \rfloor) * hour\_coal$
11:  end if
12:  while $k \leq daily\_runtime[i]$ do
13:    if $k == 1$ and $daily\_runtime[i] < daily\_monitor[i]$ and $daily\_runtime[i-1] == 0$ then
14:      $rulu\_mei \leftarrow rulu\_mei - (daily\_runtime[i] - \lfloor daily\_runtime[i] \rfloor) * hour\_coal$
15:      $emission \leftarrow emission + cems[l]$
16:      $l \leftarrow l + 1$
17:    else
18:      if $rulu\_mei \geq hour\_coal$ then
19:        $rulu\_mei \leftarrow rulu\_mei - hour\_coal$
20:        $emission \leftarrow emission + cems[l]$
21:        $l \leftarrow l + 1$

FIG.2A

```
22:        else
23:           emission ← emission + cems[l] * rulu_mei/hour_coal
24:           result[j] ← emission
25:           emission ← cems[l] * (1 - rulu_mei/hour_coal)
26:           l ← l + 1
27:           j ← j + 1
28:           rulu_mei ← mei[j] - (hour_coal - rulu_mei)
29:        end if
30:     else
31:        if k == daily_runtime[i] and daily_runtime[i] < daily_monitor[i] and daily_runtime[i + 1] == 0 then
32:           rulu_mei ← rulu_mei - (daily_runtime[i] - ⌊daily_runtime[i]⌋) * hour_coal
33:           emission ← emission + cems[l]
34:           l ← l + 1
35:        end if
36:     end if
37:  end while
38:  if daily_runtime[i] ≥ daily_monitor[i] and daily_runtime[i + 1] == 0 then
39:     rulu_mei ← rulu_mei - (daily_runtime[i] - ⌊daily_runtime[i]⌋) * hour_coal
40:  end if
41: end for
42: return result
```

FIG. 2B

METHOD, DEVICE, AND MEDIUM FOR PREDICTING FLUE DUST CONCENTRATION

TECHNICAL FIELD

The invention relates to the field of emission control technologies, and more particularly to a method, device, and medium for predicting a flue dust concentration.

BACKGROUND

During a power generation process of coal-fired power plants, a large amount of flue dust (also referred to as smoke dust) is produced, which not only affects a safe and stable operation of units but also causes serious damage to the ecological environment. Therefore, China has introduced a series of ultra-low emission policies for coal-fired power plants and carries out strict accounting and verification work on emission of the flue dust. When a continuous emission monitoring system (CEMS) continuously monitors the flue dust, due to drastic and highly random changes in a concentration of the flue dust, it is necessary to use sensors with high sensitivity and rapid response to accurately measure the concentration of flue dust. However, in practical applications, components in the CEMS are prone to wear or aging, which can lead to measurement anomalies and other issues.

SUMMARY

The invention is provided to solve above problems in the related art. Therefore, there is a need for a method, a device, and a medium for predicting a flue dust concentration that can quickly and effectively update weights and threshold parameters of a neural network, generate a general rule between material data and flue dust emission, serve as a reference for flue dust monitoring data, and simplify an accounting and verification process of coal-fired power plants, thereby reducing burdens on human labor.

In a first aspect, the invention provides the method for predicting the flue dust concentration, including following steps.

Raw data is cleaned, the raw data includes coal quality data and quantity data of each batch of coal fed into a furnace, as well as hourly flue dust emission amount.

A flue dust emission amount of each batch of the coal fed into the furnace is calculated based on hourly coal consumption of a unit, and the coal quality data, the quantity data, and the flue dust emission amount of each batch of the coal fed into the furnace are normalized to obtain a data set.

A prediction model is constructed, the prediction model is trained by using the data set to obtain a trained prediction model, and the flue dust concentration is predicted by the trained prediction model.

In an embodiment, the coal quality data includes data in six properties, the data in six properties are a dry-based higher heating value, volatile matter, an air-dried coal water content, an air-dried coal ash content, a dry-based total sulfur content, and analytical hydrogen, and the quantity data represents a quantity of the coal fed into the furnace corresponding to the coal quality data.

In an embodiment, the step that raw data is cleaned, specifically includes following steps.

In a case of missing values in the raw data, when consecutive values are missing, the consecutive values are deleted directly, and when a value is missing, a nearest neighbor interpolation is performed on the value.

In an embodiment, the step that a flue dust emission amount of each batch of the coal fed into the furnace is calculated based on hourly coal consumption of a unit, specifically includes following steps.

The hourly coal consumption of the unit is calculated based on actual daily runtime of the unit and daily coal consumption.

An index of the coal fed into the furnace is placed at a first batch of the coal fed into the furnace and an index of flue dust monitoring values is placed at a first flue dust monitoring value to obtain a current coal quantity, the current coal quantity is a quantity of the first batch of the coal fed into the furnace obtained when a flue dust emission amount corresponding to the first batch of the coal fed into the furnace is 0.

When the current coal quantity is greater than the hourly coal consumption, the flue dust emission amount (i.e., the flue dust emission amount corresponding to the first batch of the coal fed into the furnace) is added to a flue dust monitoring value corresponding to the index of the flue dust monitoring values (i.e., the first flue dust monitoring value corresponding to the index of the flue dust monitoring values), the index of the flue dust monitoring values is added to 1, the hourly coal consumption is subtracted from the current coal quantity.

When the current coal quantity is less than the hourly coal consumption, a product of the current coal quantity divided by the hourly coal consumption and the flue dust monitoring value (i.e., the first flue dust monitoring value) is added to the flue dust emission amount (i.e., the flue dust emission amount corresponding to the first batch of the coal fed into the furnace) to obtain an updated flue dust emission amount, the updated flue dust emission amount is stored and then updated to a product of a difference of the hourly coal consumption minus the current coal quantity divided by the hourly coal consumption and the flue dust monitoring value (i.e., the first flue dust monitoring value), the index of the flue dust monitoring values is added to 1, the index of the coal fed into the furnace is added to 1 to obtain a current index of the coal fed into the furnace, and the current coal quantity is updated to the quantity data of a current batch of the coal fed into the furnace corresponding to the current index of the coal fed into the furnace plus the current coal quantity minus the hourly coal consumption.

In an embodiment, the step that a flue dust emission amount of each batch of the coal fed into the furnace is calculated based on hourly coal consumption of a unit, further includes following steps.

Monitoring time of the flue dust emission amount is obtained.

When the actual daily runtime is greater than the monitoring time, in a case of the unit being shut down, after calculating the daily coal consumption and daily flue dust emission amount, a product of a decimal part of the actual daily runtime and the hourly coal consumption is subtracted from the current coal quantity as an updated current coal quantity.

When the actual daily runtime is greater than the monitoring time, in a case of the unit being started, before calculating the daily coal consumption and the daily flue dust emission amount, the product of the decimal part of the actual daily runtime and the hourly coal consumption is subtracted from the current coal quantity as the updated current coal quantity.

When the actual daily runtime is less than the monitoring time, in the case of the unit being shut down, when processing a last monitoring hour of a day, the product of the decimal part of the actual daily runtime and the hourly coal consumption is subtracted from the current coal quantity as the updated current coal amount.

When the actual daily runtime is less than the monitoring time, in the case of the unit being started, when processing a first monitoring hour of the day, the product of the decimal part of the actual daily runtime and the hourly coal consumption is subtracted from the current coal quantity as the updated current coal amount.

In an embodiment, the prediction model is a backpropagation neural network (BPNN), the BPNN includes an input layer, at least one hidden layer, and an output layer, a weight initialization mode of the BPNN is Glorot uniform distribution initialization, a threshold is initialized to 0, and a rectified linear unit (ReLu) function is selected as an activation function for the BPNN.

In an embodiment, the step that the prediction model is trained by using the data set, specifically includes following steps.

The data set is divided into a training data set and a test data set according to a set ratio.

The training data set is input into the BPNN, and inputs and outputs of the at least one hidden layer and the output layer are calculated through forward propagation.

An error of a predicted result of the output layer is calculated by using a mean square error (MSE) formula, the MSE formula is expressed as:

$$mse = \frac{1}{n}\sum(y-\hat{y})^2,$$

where mse represents a mean square error, y represents a real value, $\hat{y}$ represents a predicted value, and n represents a total sample number.

Backward propagation is performed on the error, model parameters are optimized based on an adaptive moment estimation (Adam for short) optimizer through formulas below, a connection weight and a threshold between the at least one hidden layer and the output layer are adjusted:

$$m_t = \beta_1 \cdot m_{t-1} + (1-\beta_1) \cdot dk,$$
$$v_t = \beta_2 \cdot v_{t-1} + (1-\beta_2) \cdot dk^2,$$
$$w_t = w_{t-1} - \frac{\alpha}{\sqrt{v_t+\varepsilon}} m_t,$$
$$b_t = b_{t-1} - \frac{\alpha}{\sqrt{v_t+\varepsilon}} m_t,$$

where $m_{t-1}$ and $v_{t-1}$ represent first-order moment estimates before iteration, $m_t$ and $v_t$ represent first-order moment estimates after iteration, $\beta_1$ and $\beta_2$ represent exponential weighted average parameters, dk represents a gradient of a weight w and a threshold b, $\alpha$ represents a learning rate, $\varepsilon$ represents a constant to prevent a denominator from being 0, $w_{t-1}$ and $b_{t-1}$ represent a weight to be trained and a threshold to be trained respectively, $w_t$ and $b_t$ represent a trained weight and a trained threshold respectively.

The steps from the forward propagation to the backward propagation are repeated until a preset number of training iterations is reached.

A trained BPNN as the trained prediction model is evaluated by using the test data set.

In an embodiment, the step that a trained BPNN is evaluated by using the test data set, specifically includes following steps.

After training the prediction model, the test data set is input, a predicted value is obtained by forward propagation calculation, and a predicted result is evaluated by the MSE, a root mean squared error (RMSE), a mean absolute error (MAE) and a determination coefficient $R^2$, with calculation formulas below:

$$MSE = \frac{1}{n}\sum(y-\hat{y})^2,$$

$$RMSE = \sqrt{\frac{1}{n}\sum(y-\hat{y})^2},$$

$$MAE = \frac{1}{n}\sum|y-\hat{y}|,$$

$$R^2 = 1 - \frac{SSR}{SST} = 1 - \frac{\sum(y-\hat{y})^2}{\sum(y-\bar{y})^2},$$

where SSR represents a regression sum of squares, and SST represents a total sum of squares.

In a second aspect, the invention provides the device for predicting the flue dust concentration, including a cleaning module, a calculation module and a training module.

The cleaning module is configured to clean the raw data, the raw data includes the coal quality data and the quantity data of the coal fed into the furnace, as well as the hourly flue dust emission amount.

The calculation module is configured to calculate the flue dust emission amount corresponding to each batch of the coal fed into the furnace based on the hourly coal consumption of the unit, and normalize the coal quality data, the quantity data, and the flue dust emission amount of each batch of the coal fed into the furnace to obtain the data set.

The training module is configured to construct the prediction model, train the prediction model by using the data set to obtain a trained prediction model, and use the trained prediction model to predict the flue dust concentration.

In a third aspect, the invention provides a non-transitory computer-readable storage medium, the non-transitory computer-readable storage medium stores one or more programs, the one or more programs is configured to be executed by one or more processors to achieve the method.

The invention at least has below beneficial effects.

(1) The invention can solve problems of measurement errors and complex manual accounting and verification in the related art, thereby achieving precise measurement of the flue dust emissions from the coal-fired power plants and reducing workloads of manual operations.

(2) The invention calculates the flue dust emission amount of each batch of the coal fed into the furnace based on the hourly coal consumption of the unit as a label value of the prediction model. By training the prediction model, a general rule between data of the coal fed into the furnace and a corresponding flue dust emission amount can be generated, a relationship between material and the flue dust emission amount can be accurately identified, the workload of manual accounting and verification can be reduced, and a reference for CEMS flue dust monitoring data is provided. At the same time, using an Adam algorithm to optimize the BPNN allows for automatic adjustment of the learning rate for each parameter, enabling fast and efficient training of the prediction model.

BRIEF DESCRIPTION OF DRAWINGS

FIG. 2 illustrates a calculation flowchart of a flue dust emission amount according to the embodiment of the invention.

DETAILED DESCRIPTION OF EMBODIMENTS

Figure 1:
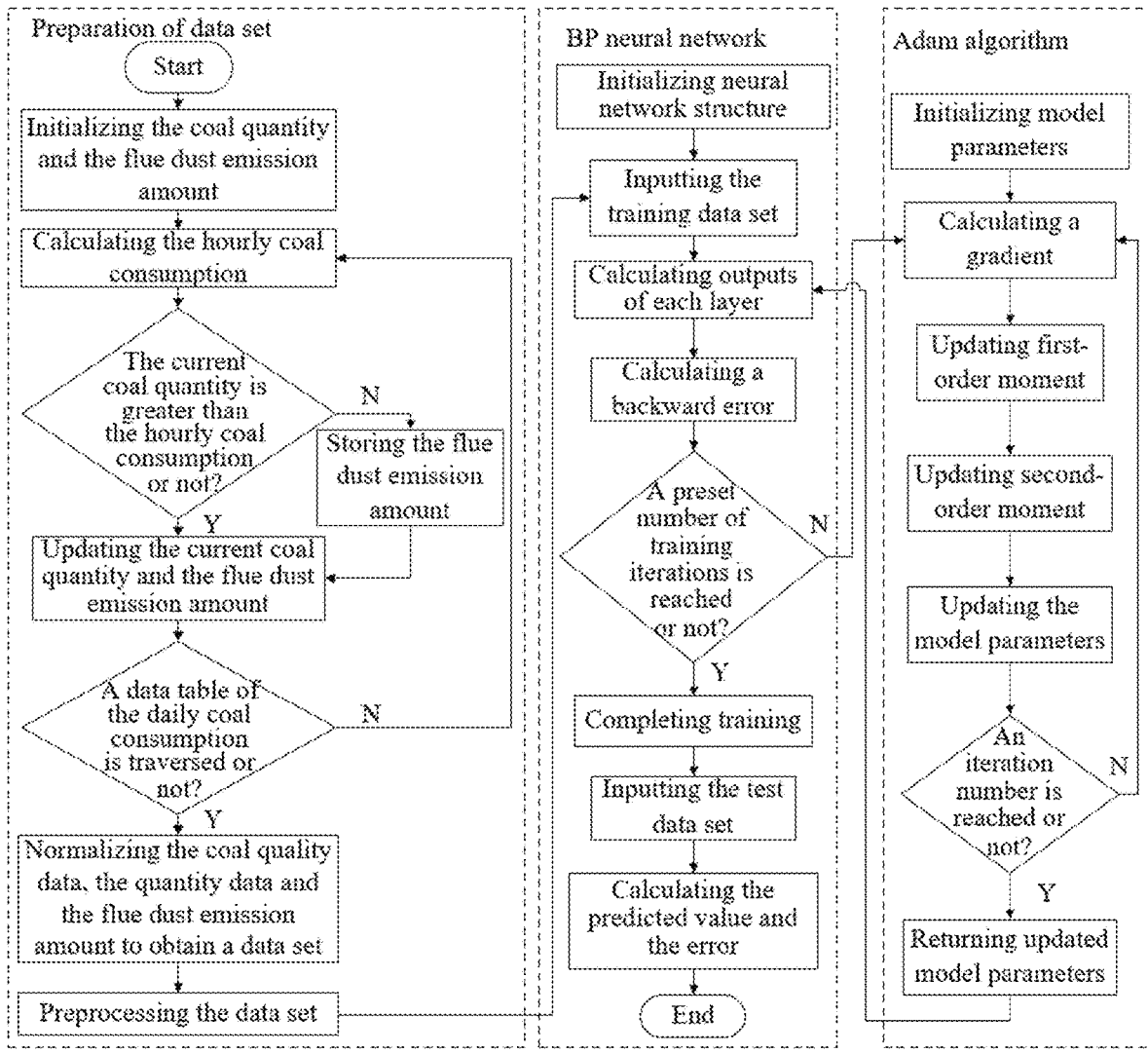
FIG. 1 illustrates a flowchart of a method for predicting a flue dust concentration according to an embodiment of the invention.

In order to help those skilled in the art better understand technical solutions of the invention, a detailed explanation of the invention is provided below in conjunction with the accompanying drawings and specific implementation methods. A further detailed description of the embodiments of the invention is provided in conjunction with the accompanying drawings and specific embodiments, but does not serve as a limitation of the invention. If there is no necessity for the steps described in the specification to have a logical relationship with each other, the order in which the steps described as examples in the specification should not be considered a limitation. Those skilled in the art should know that the steps can be adjusted in order as long as the logical relationship between them is not disrupted, making an entire process impossible to implement.

An embodiment of the invention provides a method for predicting a flue dust concentration. Specifically, the method for predicting the flue dust concentration may be a method for predicting a flue dust concentration of a coal-fired power plant based on a BPNN optimized by an Adam algorithm. The method includes following steps.

Step 1: Preprocessing of raw data: coal quality data and quantity data of each batch of coal fed into a furnace, as well as hourly flue dust emission amount monitored by a CEMS are cleaned.

It should be noted that, the raw data in step 1 includes two parts, one part includes data in six properties consisting of a dry-based higher heating value, volatile matter, an air-dried coal water content, an air-dried coal ash content, a dry-based total sulfur content, and analytical hydrogen, as well as a quantity of the coal fed into the furnace corresponding to the coal quality data (i.e., the quantity data). The other part includes the hourly flue dust emission amount monitored by the CEMS. In a case of missing values in the raw data, when consecutive values are missing, the consecutive values are deleted directly, and when a value is missing, a nearest neighbor interpolation is performed on the value.

Step 2: Calculation of a flue dust emission amount corresponding to each batch of the coal fed into the furnace: the flue dust emission amount corresponding to each batch of the coal fed into the furnace is calculated based on hourly coal consumption of a unit, and the coal quality data, the quantity data, and the flue dust emission amount corresponding to each batch of the coal fed into the furnace are normalized as input data of a prediction model.

In a specific embodiment, in step 2, firstly, the hourly coal consumption of the unit is calculated based on actual daily runtime of the unit and daily coal consumption, and daily monitoring time of the CEMS is obtained. Secondly, an initialization of calculations is performed, an index of the coal fed into the furnace is placed at a first batch of the coal fed into the furnace and an index of flue dust monitoring values is placed at a first flue dust monitoring value, a flue dust emission amount corresponding to the first batch of the coal fed into the furnace is set to be 0, a quantity of the first batch of the coal fed into the furnace is obtained as current coal quantity. Thirdly, when the current coal quantity is greater than the hourly coal consumption, the flue dust emission amount is added to a flue dust monitoring value corresponding to the index of the flue dust monitoring values, the index of the flue dust monitoring values is added to 1, the hourly coal consumption is subtracted from the current coal quantity; or when the current coal quantity is less than the hourly coal consumption, a product of the current coal quantity divided by the hourly coal consumption and the flue dust monitoring value is added to the flue dust emission amount to obtain an updated flue dust emission amount, the updated flue dust emission amount is stored and then updated to a product of a difference of the hourly coal consumption minus the current coal quantity divided by the hourly coal consumption and the flue dust monitoring value, the index of the flue dust monitoring values is added to 1, the index of the coal fed into the furnace is added to 1 to obtain a current index of the coal fed into the furnace, and the current coal quantity is updated to the quantity data of a current batch of the coal fed into the furnace corresponding to the current index of the coal fed plus the current coal quantity minus the hourly coal consumption. Above steps are repeated until a data table of the daily coal consumption is traversed.

Exemplarily, a specific calculation process of step 2 can be found in FIG. 2.

In a specific embodiment, the coal quality data, the quantity data and the flue dust emission amount of each batch of the coal fed into the furnace are normalized to obtain a data set (X, Y), where X represents the coal quality data and the quantity data of each batch of the coal fed into the furnace as a feature value of the prediction model, Y represents a flue dust emission amount of a respective batch of the coal fed into the furnace as a label value of the prediction model. The data set is expressed as below:

$$X = \begin{pmatrix} x_{11} & x_{12} & \cdots & \cdots & x_{1n} \\ x_{21} & x_{22} & \cdots & \cdots & x_{2n} \\ \vdots & \vdots & \ddots & & \vdots \\ \vdots & \vdots & & \ddots & \vdots \\ x_{n1} & x_{n2} & \cdots & \cdots & x_{nn} \end{pmatrix},$$

$$Y = \begin{pmatrix} y_1 \\ y_2 \\ \vdots \\ \vdots \\ y_n \end{pmatrix}.$$

Step 3: BPNN prediction: the input data (i.e., the data set) is divided into a training data set and a test data set, a network structure is determined, the BPNN is trained, the test data is predicted, and a test error and a prediction result are obtained.

In a specific embodiment, in the step 3, the data set is divided to the training data set (X_train, Y_train) and the test data set (X_test, Y_test) according to a set ratio of 8:2, the BPNN is constructed including an input layer, a first hidden layer, a second hidden layer and an output layer, a weight initialization mode of the BPNN is Glorot uniform distribution initialization, a threshold is initialized to 0, and a ReLu function is selected as an activation function for the BPNN. The ReLu function is expressed as: y=max(0, x), where y represents an output, x represents an input, and max represents a maximum value function.

The training data set is used to train the BPNN. The training data set is input to the BPNN, and inputs and outputs of the first hidden layer, the second hidden layer and the output layer are calculated through forward propagation. The test error of a predicted result of the output layer is calculated by using a mean square error (MSE) formula, backward propagation is performed on the test error, model parameters are optimized based on an Adam optimizer, a connection weight and a threshold between the hidden layers and the output layer are adjusted. The steps from the forward propagation to the backward propagation are repeated until a preset number of training iterations is reached.

The MSE formula is expressed as:

$$mse = \frac{1}{n}\sum (y - \hat{y})^2,$$

where mse represents a mean square error, y represents a real value, and $\hat{y}$ represents a predicted value.

For a weight $w_t$ and a threshold $b_t$, calculation formulas of the Adam optimizer are expressed as below:

$$m_t = \beta_1 \cdot m_{t-1} + (1 - \beta_1) \cdot dk,$$

$$v_t = \beta_2 \cdot v_{t-1} + (1 - \beta_2) \cdot dk^2,$$

$$w_t = w_{t-1} - \frac{\alpha}{\sqrt{v_t + \varepsilon}} m_t,$$

$$b_t = b_{t-1} - \frac{\alpha}{\sqrt{v_t + \varepsilon}} m_t,$$

where $m_{t-1}$ and $v_{t-1}$ represent first-order moment estimates before iteration, $m_t$ and $v_t$ represent first-order moment estimates after the iteration, $\beta_1$ and $\beta_2$ represent exponential weighted average parameters, dk represents a gradient of the weight w and the threshold b, $\alpha$ represents a learning rate, $\varepsilon$ represents a constant to prevent a denominator from being 0, $w_{t-1}$ and $b_{t-1}$ represent a weight to be trained and a threshold to be trained respectively, $w_t$ and $b_t$ represent a trained weight and a trained threshold respectively.

Exemplarily, the Adam algorithm is used to update the weight and the threshold of the prediction model, the Adam algorithm can calculate individual adaptive learning rates for different parameters based on the gradient of the first-order moment and the second-order moment. The calculation steps are as follows:

The first-order moment estimates are calculated, $m_t = \beta_1 \cdot m_{t-1} + (1-\beta_1) \cdot dk$, where $m_{t-1}$ and $m_t$ represent the first-order moment estimates before and after the iteration, $\beta_1$ represents the exponential weighted average parameter, and dk represents the gradient of the weight w and the threshold b.

The second-order moment estimates are calculated, $v_t = \beta_2 \cdot v_{t-1} + (1-\beta_2) \cdot dk^2$, where $v_{t-1}$ and $v_t$ represent second-order moment estimates before and after the iteration, $\beta_2$ represents the exponential weighted average parameter, and $dk^2$ represents a gradient square of the weight w and the threshold b.

The Adam algorithm combines an adaptive learning rate optimization algorithm (adaptive gradient, Adagrad) and root mean square transfer algorithm (root mean square prop, RMSProp). Compared with traditional gradient descent methods, the Adam algorithm can better adapt to update speeds of different parameters by adaptively adjusting the learning rate, thereby accelerating convergence speeds. In addition, the Adam algorithm has good robustness and can adapt to different types of training data. Compared to other optimization algorithms such as the Adagrad and the RMSProp, the Adam optimizer performs better in handling non-stationary objective functions.

The first-order moment estimate and the second-order moment estimate are combined to update the weight and the threshold, $$w_t = w_{t-1} - \frac{\alpha}{\sqrt{v_t + \varepsilon}} m_t,$$

$$b_t = b_{t-1} - \frac{\alpha}{\sqrt{v_t + \varepsilon}} m_t,$$

where $w_t$ and $b_t$ represent the trained weight and the trained threshold respectively, $w_{t-1}$ and $b_{t-1}$ represent the weight to be trained and the threshold to be trained respectively, $\alpha$ represents the learning rate, and $\varepsilon$ represents the constant to prevent a denominator from being 0.

After training the prediction model, the test data set $X_{test}$ is input, the predicted value is obtained by forward propagation calculation, and the predicted result is evaluated by the MSE, a root mean squared error (RMSE), a mean absolute error (MAE) and a determination coefficient $R^2$, calculation formulas are as follows:

$$MSE = \frac{1}{n}\sum (y - \hat{y})^2,$$

$$RMSE = \sqrt{\frac{1}{n}\sum (y - \hat{y})^2},$$

$$MAE = \frac{1}{n}\sum |y - \hat{y}|,$$

$$R^2 = 1 - \frac{SSR}{SST} = 1 - \frac{\sum (y - \hat{y})^2}{\sum (y - \bar{y})^2},$$

where SSR represents a regression sum of squares, and SST represents a total sum of squares.

The predicted result is shown in Table 1.

TABLE 1

| Flue dust prediction and evaluation index | | | |
|---|---|---|---|
| MSE | RMSE | MAE | $R^2$ |
| 53.653274 | 7.324840 | 6.145478 | 0.653019 |

It can be seen from the Table 1 that through a comprehensive evaluation of multiple regression evaluation indicators, the method has high accuracy and can identify a general pattern between the coal fed into the furnace and the flue dust emission amount. The method can be applied in an actual production process of the coal-fired power plant to address problem of errors in the CEMS and provide reference basis for flue dust monitoring data. By using the method of the invention, real-time measurement and input of the coal quality data and the quantity data of the coal fed into the furnace are performed to identify whether there are abnormalities in the CEMS, and to a certain extent reflect quality of coal detection data, thereby reducing the workload of the manual accounting and verification.

Figure 3:
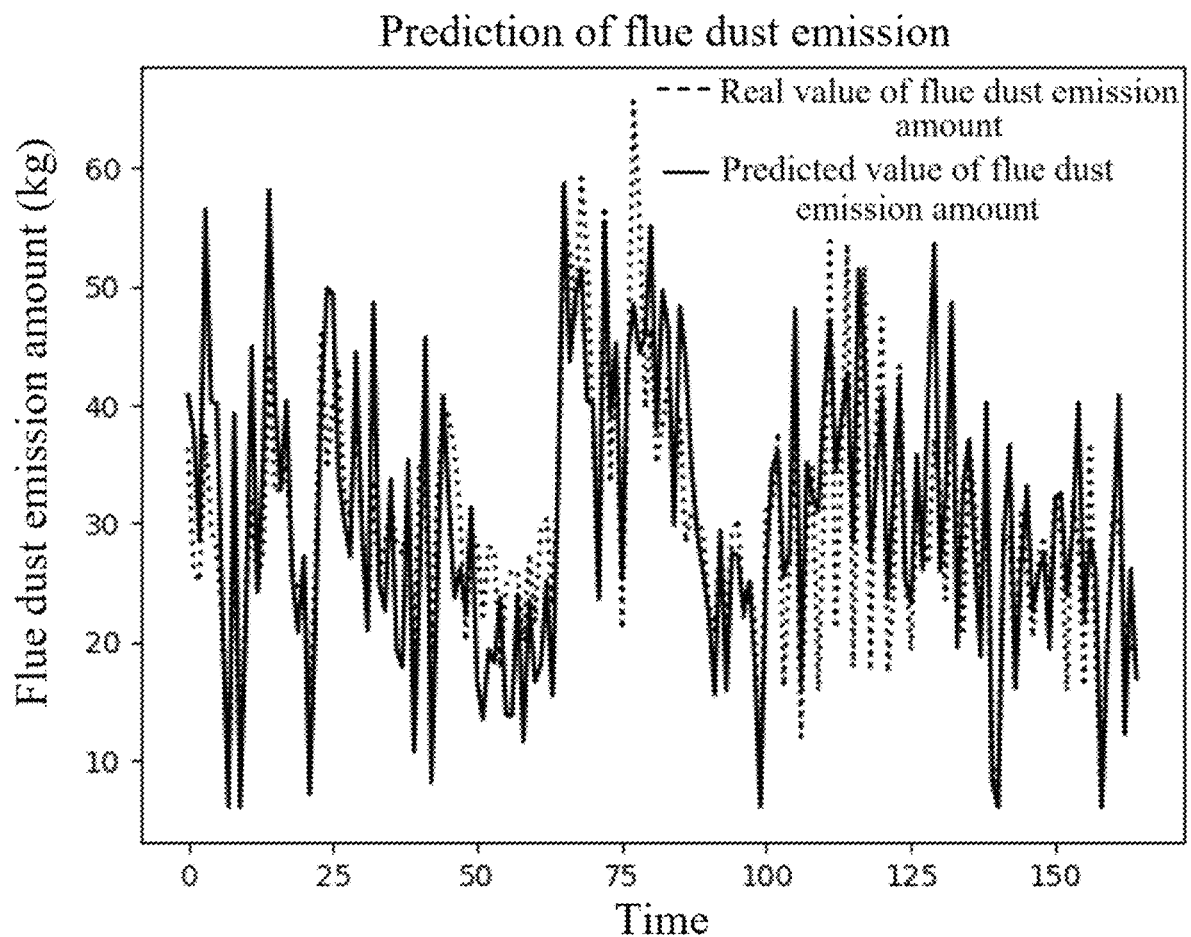
FIG. 3 illustrates a schematic diagram of a predicted result of the flue dust emission amount according to the embodiment of the invention.

Based on a trained prediction model, the prediction result of the flue dust emission amount is shown in FIG. 3. As shown in FIG. 3, the invention has high accuracy in predicting the flue dust emission amount.

Figure 4:
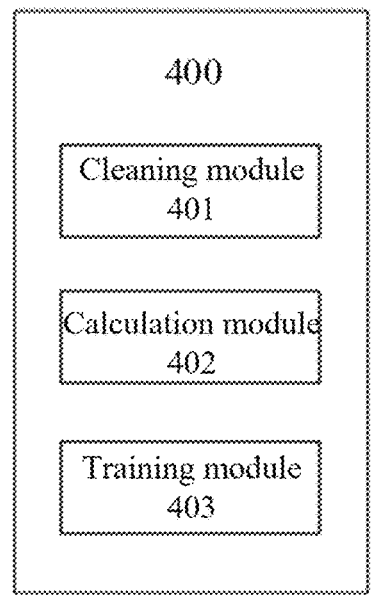
FIG. 4 illustrates a schematic structural diagram of a device for predicting the flue dust concentration according to the embodiment of the invention.

The embodiment of the invention further provides a device 400 for predicting the flue dust concentration. Referring to FIG. 4, the device 400 includes a cleaning module 401, a calculation module 402 and a training module 403.

The cleaning module 401 is configured to clean the raw data, the raw data includes the coal quality data and the quantity data of the coal fed into the furnace, as well as the hourly flue dust emission amount.

The calculation module 402 is configured to calculate the flue dust emission amount corresponding to each batch of the coal fed into the furnace based on the hourly coal consumption of the unit, and normalize the coal quality data, the quantity data, and the flue dust emission amount of each batch of the coal fed into the furnace to obtain the data set.

The training module 403 is configured to construct the prediction model, train the prediction model by using the data set to obtain the trained prediction model, and use the trained prediction model to predict the flue dust concentration.

In some embodiments, the coal quality data includes the data in six properties consisting of the dry-based higher heating value, the volatile matter, the air-dried coal water content, the air-dried coal ash content, the dry-based total sulfur content and the analytical hydrogen, and the quantity data represents the quantity of the coal fed into the furnace corresponding to the coal quality data.

In some embodiments, the cleaning module 401 is further configured to, in a case of missing values in the raw data, directly delete consecutive values when the consecutive values are missing, and perform a nearest neighbor interpolation on a value when the value is missing.

In some embodiments, the calculation module 402 is further configured to perform following steps.

The hourly coal consumption of the unit is calculated based on the actual daily runtime of the unit and the daily coal consumption.

The index of the coal fed into the furnace is placed at the first batch of the coal fed into the furnace and the index of flue dust monitoring values is placed at the first flue dust monitoring value to obtain the current coal quantity, the current coal quantity is the quantity of the first batch of the coal fed into the furnace obtained when the flue dust emission amount corresponding to the first batch of the coal fed into the furnace is 0.

When the current coal quantity is greater than the hourly coal consumption, the flue dust emission amount is added to the flue dust monitoring value corresponding to the index of the flue dust monitoring values, the index of the flue dust monitoring values is added to 1, the hourly coal consumption is subtracted from the current coal quantity.

When the current coal quantity is less than the hourly coal consumption, the product of the current coal quantity divided by the hourly coal consumption and the flue dust monitoring value is added to the flue dust emission amount to obtain the updated flue dust emission amount, the updated flue dust emission amount is stored and then updated to the product of the difference of the hourly coal consumption minus the current coal quantity divided by the hourly coal consumption and the flue dust monitoring value, the index of the flue dust monitoring values is added to 1, the index of the coal fed into the furnace is added to 1 to obtain the current index of the coal fed into the furnace, and the current coal quantity is updated to the quantity data of the current batch of the coal fed into the furnace corresponding to the current index of the coal fed into the furnace plus the current coal quantity minus the hourly coal consumption.

In some embodiments, the training module 403 is further configured to perform following steps.

Monitoring time of the flue dust emission amount is obtained.

When the actual daily runtime is greater than the monitoring time, in a case of the unit being shut down, after calculating the daily coal consumption and daily flue dust emission amount, a product of a decimal part of the actual daily runtime and the hourly coal consumption is subtracted from the current coal quantity as an updated current coal quantity.

When the actual daily runtime is greater than the monitoring time, in a case of the unit being started, before calculating the daily coal consumption and the daily flue dust emission amount, the product of the decimal part of the actual daily runtime and the hourly coal consumption is subtracted from the current coal quantity as the updated current coal quantity.

When the actual daily runtime is less than the monitoring time, in the case of the unit being shut down, when processing a last monitoring hour of a day, the product of the decimal part of the actual daily runtime and the hourly coal consumption is subtracted from the current coal quantity as the updated current coal amount.

When the actual daily runtime is less than the monitoring time, in the case of the unit being started, when processing a first monitoring hour of the day, the product of the decimal part of the actual daily runtime and the hourly coal consumption is subtracted from the current coal quantity as the updated current coal amount.

In some embodiments, the prediction model is the BPNN, the BPNN includes the input layer, at least one hidden layer, and the output layer, the weight initialization mode of the BPNN is the Glorot uniform distribution initialization, the threshold is initialized to 0, and the ReLu function is selected as the activation function for the BPNN.

In some embodiments, the training module 403 is further configured to perform following steps.

The data set is divided into the training data set and the test data set according to a set ratio.

The training data set is input into the BPNN, and the inputs and the outputs of the at least one hidden layer and the output layer are calculated through the forward propagation.

The error of the predicted result of the output layer is calculated by using the MSE formula, the MSE formula is expressed as:

$$mse = \frac{1}{n}\sum(y - \hat{y})^2,$$

where mse represents the mean square error, y represents the real value, $\hat{y}$ represents the predicted value, and n represents the total sample number.

The backward propagation is performed on the error, model parameters are optimized based on the Adam optimizer through the formulas below, the connection weight and the threshold between the at least one hidden layer and the output layer are adjusted:

$$m_t = \beta_1 \cdot m_{t-1} + (1-\beta_1) \cdot dk,$$

$$v_t = \beta_2 \cdot v_{t-1} + (1-\beta_2) \cdot dk^2,$$

$$w_t = w_{t-1} - \frac{\alpha}{\sqrt{v_t+\varepsilon}} m_t,$$

$$b_t = b_{t-1} - \frac{\alpha}{\sqrt{v_t+\varepsilon}} m_t,$$

where $m_{t-1}$ and $v_{t-1}$ represent the first-order moment estimates before the iteration, $m_t$ and $v_t$ represent the first-order moment estimates after the iteration, $\beta_1$ and $\beta_2$ represent the exponential weighted average parameters, dk represents the gradient of the weight w and the threshold b, $\alpha$ represents the learning rate, $\varepsilon$ represents the constant to prevent the denominator from being 0, $w_{t-1}$ and $b_{t-1}$ represent the weight to be trained and the threshold to be trained respectively, and $w_t$ and $b_t$ represent the trained weight and the trained threshold respectively.

The steps from the forward propagation to the backward propagation are repeated until the preset number of training iterations is reached.

The trained BPNN is evaluated by using the test data set.

In some embodiments, the training module 403 is further configured to perform following steps.

After training the prediction model, the test data set is input, the predicted value is obtained by the forward propagation calculation, and the predicted result is evaluated by the MSE, the RMSE, the MAE and the determination coefficient $R^2$, with the calculation formulas below:

$$MSE = \frac{1}{n}\sum(y-\hat{y})^2,$$

$$RMSE = \sqrt{\frac{1}{n}\sum(y-\hat{y})^2},$$

$$MAE = \frac{1}{n}\sum|y-\hat{y}|,$$

$$R^2 = 1 - \frac{SSR}{SST} = 1 - \frac{\sum(y-\hat{y})^2}{\sum(y-\bar{y})^2},$$

where SSR represents the regression sum of squares, and SST represents the total sum of squares.

It should be noted that each device structure described in the embodiment belongs to the same technical concept as the method described, and achieves the same technical effect through the same principles, which is not repeated here.

The embodiment of the invention further provides a non-transitory computer-readable storage medium. The non-transitory computer-readable storage medium stores one or more programs, the one or more programs is configured to be executed by one or more processors to implement the method in the embodiments above.

Furthermore, although exemplary embodiments have been described in the specification, their scope includes any and all embodiments based on the invention that have equivalent elements, modifications, omissions, combinations (e.g., schemes where various embodiments intersect), adaptations or changes. The elements in the claims will be interpreted broadly based on the language used in the claims, not limited to the embodiments described in this specification or during an implementation period of the invention, which are interpreted as non-exclusive. Therefore, this specification and embodiments are intended to be considered only as examples, and the true scope and spirit are indicated by the full scope of the claims and their equivalents.

The above description is intended to be explanatory rather than restrictive. For example, the above examples (or one or more of them) can be used in combination with each other. For example, those skilled in the art may use other embodiments when reading the above description. In addition, in the above specific embodiments, various features can be grouped together to simplify the invention. This should not be interpreted as a feature of the invention that does not require protection as necessary for any claim. On the contrary, the subject matter of the invention may be less than all the features of specific embodiments of the invention. Therefore, the claims are incorporated into specific embodiments as examples or embodiments, where each claim is independently considered as a separate embodiment, and these embodiments may be combined with each other in various combinations or arrangements. The scope of the invention shall be determined by reference to the attached claims and the full scope of the equivalent forms of rights granted to these claims.

What is claimed is:

1. A method for predicting a flue dust concentration, comprising:
    cleaning raw data, wherein the raw data comprises coal quality data and quantity data of each batch of coal fed into a furnace, as well as hourly flue dust emission amount monitored by a continuous emission monitoring system (CEMS);
    calculating a flue dust emission amount of each batch of the coal fed into the furnace based on hourly coal consumption of a unit, and normalizing the coal quality data, the quantity data, and the flue dust emission amount of each batch of the coal fed into the furnace to obtain a data set;
    constructing a prediction model, training the prediction model by using the data set to obtain a trained prediction model, and predicting the flue dust concentration by the trained prediction model; and
    comparing the hourly flue dust emission amount with the flue dust concentration predicted by the trained prediction model to determine whether the CEMS is abnormal; and in response to the CEMS being determined to be abnormal, inspecting and repairing, by maintenance personnel, the CEMS;
    wherein the prediction model is a backpropagation neural network (BPNN), the BPNN comprises an input layer, at least one hidden layer, and an output layer, a weight initialization mode of the BPNN is Glorot uniform distribution initialization, a threshold is initialized to 0, and a rectified linear unit (ReLu) function is selected as an activation function for the BPNN;
    wherein the training the prediction model by using the data set specifically comprises:
        dividing the data set into a training data set and a test data set according to a set ratio;
        inputting the training data set into the BPNN, and calculating inputs and outputs of the at least one hidden layer and the output layer through forward propagation;
        calculating an error of a predicted result of the output layer by using a mean square error (MSE) formula, wherein the MSE formula is expressed as:

$$mse = \frac{1}{n}\sum(y - \hat{y})^2,$$

where mse represents a mean square error, y represents a real value, ŷ represents a predicted value, and n represents a total sample number;

performing backward propagation on the error, optimizing model parameters based on an adaptive moment estimation (Adam) optimizer through formulas below, adjusting a connection weight and a threshold between the at least one hidden layer and the output layer:

$$m_t = \beta_1 \cdot m_{t-1} + (1 - \beta_1) \cdot dk,$$

$$v_t = \beta_2 \cdot v_{t-1} + (1 - \beta_2) \cdot dk^2,$$

$$w_t = w_{t-1} - \frac{a}{\sqrt{v_t + \varepsilon}} m_t,$$

$$b_t = b_{t-1} - \frac{a}{\sqrt{v_t + \varepsilon}} m_t,$$

where $m_{t-1}$ and $v_{t-1}$ represent first-order moment estimates before iteration, $m_t$ and $v_t$ represent first-order moment estimates after the iteration, $\beta_1$ and $\beta_2$ represent exponential weighted average parameters, dk represents a gradient of a weight w and a threshold b, a represents a learning rate, E represents a constant to prevent a denominator from being 0, $w_{t-1}$ and $b_{t-1}$ represent a weight to be trained and a threshold to be trained respectively, $w_t$ and $b_t$ represent a trained weight and a trained threshold respectively;

repeating the steps from the forward propagation to the backward propagation until a preset number of training iterations is reached; and evaluating a trained BPNN as the trained prediction model by using the test data set;

wherein the evaluating a trained BPNN by using the test data set specifically comprises:

after training the prediction model, inputting the test data set, obtaining a predicted value by forward propagation calculation, and evaluating a predicted result by a MSE, a root mean squared error (RMSE), a mean absolute error (MAE) and a determination coefficient $R^2$, with calculation formulas as follows:

$$MSE = \frac{1}{n}\sum(y - \hat{y})^2,$$

$$RMSE = \sqrt{\frac{1}{n}\sum(y - \hat{y})^2},$$

$$MAE = \frac{1}{n}\sum|y - \hat{y}|,$$

$$R^2 = 1 - \frac{SSR}{SST} = 1 - \frac{\sum(y - \hat{y})^2}{\sum(y - \bar{y})^2},$$

where SSR represents a regression sum of squares, and SST represents a total sum of squares.

2. The method for predicting the flue dust concentration as claimed in claim 1, wherein the coal quality data comprises data in six properties, the data in six properties are a dry-based higher heating value, volatile matter, an air-dried coal water content, an air-dried coal ash content, a dry-based total sulfur content, and analytical hydrogen, and the quantity data represents a quantity of the coal fed into the furnace corresponding to the coal quality data.

3. The method for predicting the flue dust concentration as claimed in claim 1, wherein the calculating a flue dust emission amount of each batch of the coal fed into the furnace based on hourly coal consumption of a unit specifically comprises:

calculating the hourly coal consumption of the unit based on actual daily runtime of the unit and daily coal consumption of the unit;

placing an index of the coal fed into the furnace at a first batch of the coal fed into the furnace and placing an index of flue dust monitoring values at a first flue dust monitoring value to obtain a current coal quantity, wherein the current coal quantity is a quantity of the first batch of the coal fed into the furnace obtained when a flue dust emission amount corresponding to the first batch of the coal fed into the furnace is 0; and when the current coal quantity is greater than the hourly coal consumption, adding the flue dust emission amount corresponding to the first batch of the coal fed into the furnace to the first flue dust monitoring value corresponding to the index of the flue dust monitoring values, adding the index of the flue dust monitoring values to 1, subtracting the hourly coal consumption from the current coal quantity; or when the current coal quantity is less than the hourly coal consumption, adding a product of the current coal quantity divided by the hourly coal consumption and the first flue dust monitoring value to the flue dust emission amount corresponding to the first batch of the coal fed into the furnace to obtain an updated flue dust emission amount, storing the updated flue dust emission amount and then updating the updated flue dust emission amount to a product of a difference of the hourly coal consumption minus the current coal quantity divided by the hourly coal consumption and the first flue dust monitoring value, adding the index of the flue dust monitoring values to 1, adding the index of the coal fed into the furnace to 1 to obtain a current index of the coal fed into the furnace, and updating the current coal quantity to the quantity data of a current batch of the coal fed into the furnace corresponding to the current index of the coal fed into the furnace plus the current coal quantity minus the hourly coal consumption.

4. The method for predicting the flue dust concentration as claimed in claim 3, wherein the calculating a flue dust emission amount of each batch of the coal fed into the furnace based on hourly coal consumption of a unit further comprises:

obtaining monitoring time of flue dust emission amount;

when the actual daily runtime is greater than the monitoring time:

in a case of the unit being shut down, after calculating the daily coal consumption and daily flue dust emission amount, subtracting a product of a decimal part of the actual daily runtime and the hourly coal consumption from the current coal quantity as an updated current coal quantity;

in a case of the unit being started, before calculating the daily coal consumption and the daily flue dust emission amount, subtracting the product of the decimal part of the actual daily runtime and the hourly coal consumption from the current coal quantity as the updated current coal quantity;

when the actual daily runtime is less than the monitoring time:

in the case of the unit being shut down, when processing a last monitoring hour of a day, subtracting the product of the decimal part of the actual daily runtime and the hourly coal consumption from the current coal quantity as the updated current coal amount; and in the case of the unit being started, when processing a first monitoring hour of the day, subtracting the product of the decimal part of the actual daily runtime and the hourly coal consumption from the current coal quantity as the updated current coal amount.

5. A non-transitory computer-readable storage medium storing instructions, wherein the instructions are configured to be executed by a processor to implement the method as claimed in claim 1.

* * * * *